(12) United States Patent
Zietsch et al.

(10) Patent No.: US 9,091,317 B2
(45) Date of Patent: Jul. 28, 2015

(54) DAMPING ELEMENT

(71) Applicants: Andreas Zietsch, Uechtelhausen (DE); Ines Schultheiss, Dittelbrunn (DE)

(72) Inventors: Andreas Zietsch, Uechtelhausen (DE); Ines Schultheiss, Dittelbrunn (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 13/950,363

(22) Filed: Jul. 25, 2013

(65) Prior Publication Data

US 2014/0027218 A1    Jan. 30, 2014

(30) Foreign Application Priority Data

Jul. 26, 2012   (DE) .......................... 10 2012 213 167

(51) Int. Cl.
| | |
|---|---|
| *F16F 9/32* | (2006.01) |
| *F16F 9/18* | (2006.01) |
| *F16F 9/54* | (2006.01) |
| *F16F 9/19* | (2006.01) |
| *B60G 15/07* | (2006.01) |

(52) U.S. Cl.
CPC ... *F16F 9/18* (2013.01); *F16F 9/19* (2013.01); *F16F 9/54* (2013.01); *B60G 15/07* (2013.01); *F16F 9/3242* (2013.01)

(58) Field of Classification Search
CPC ............. F16F 9/065; F16F 9/54; F16F 9/19; F16F 9/18; F16F 9/3242; F16F 9/02; B60G 15/07
USPC .......................... 188/313–317, 321.11, 322.19
See application file for complete search history.

(56) References Cited

U.S. PATENT DOCUMENTS

| | | | | |
|---|---|---|---|---|
| 4,010,829 | A | * | 3/1977 | Naito et al. .................... 188/278 |
| 4,273,220 | A | * | 6/1981 | Tilkens ....................... 188/282.1 |
| 5,810,128 | A | * | 9/1998 | Eriksson et al. .............. 188/289 |
| 6,105,740 | A | * | 8/2000 | Marzocchi et al. ......... 188/322.2 |
| 6,220,408 | B1 | * | 4/2001 | Pradel et al. .................. 188/314 |
| 7,225,906 | B2 | | 6/2007 | Wirth |
| 7,472,772 | B2 | * | 1/2009 | Ozeki ........................... 180/218 |
| 8,191,693 | B2 | | 6/2012 | Poetsch |
| 8,695,765 | B2 | * | 4/2014 | Danek et al. .................. 188/284 |
| 2007/0251778 | A1 | * | 11/2007 | Poetsch et al. ................. 188/314 |

FOREIGN PATENT DOCUMENTS

| | | | | |
|---|---|---|---|---|
| DE | 19750414 | | 9/1998 | |
| DE | 19750414 A1 | * | 9/1998 | ............ B60G 13/06 |
| DE | 19805218 | | 5/1999 | |
| DE | 10348315 | | 12/2004 | |
| DE | 102006020066 | | 10/2007 | |
| DE | 102011000357 A1 | * | 8/2012 | |

* cited by examiner

*Primary Examiner* — Thomas Irvin
(74) *Attorney, Agent, or Firm* — Cozen O'Connor

(57) ABSTRACT

A damping element, particularly for a vehicle, includes first and second cylinder chambers, a cylinder and a connection element formed as a hollow body fastened to the end of the cylinder. A movable separating piston is arranged between the second cylinder chamber and the interior of the connection element for separating the region of the second cylinder chamber that is filled with hydraulic medium from a region of the connection element that is filled with a compressible medium. The connection element has a tube cross section having an outer diameter corresponding to the inner diameter of the cylinder and is inserted into the cylinder and tightly and fixedly. The separating piston is arranged so as to be coaxially displaceable in the cylinder and its displaceability is limited relative to the end region of the cylinder by the front side of the end region of the connection element.

6 Claims, 2 Drawing Sheets

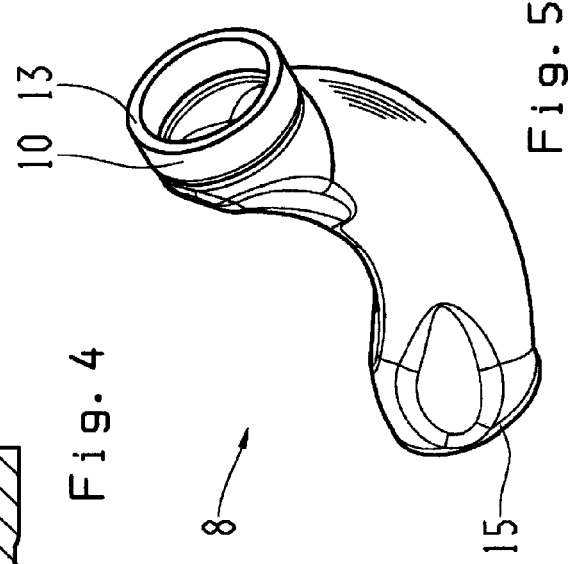
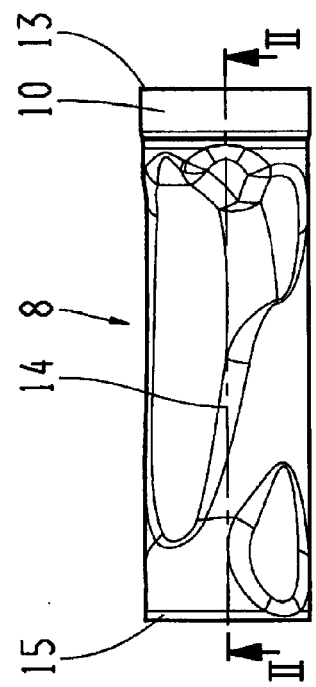
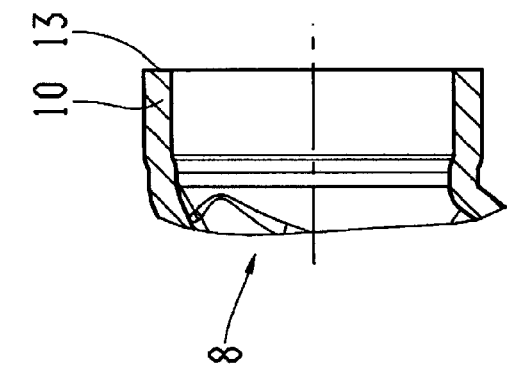
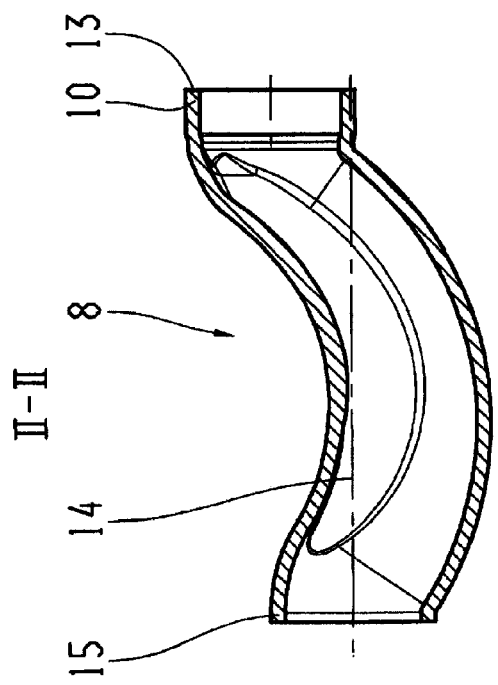

DAMPING ELEMENT

BACKGROUND OF THE INVENTION

1. Field of the Invention

The present invention is directed to a damping element, particularly a mono tube damping element for a vehicle.

2. Description of the Related Art

Damping elements, particularly for a vehicle, which can be arranged between two masses, having a cylinder in which a piston is displaceably arranged, which piston divides the interior of the cylinder into a first cylinder chamber and a second cylinder chamber which are filled with a hydraulic medium, having a throttle connection between the first cylinder chamber and second cylinder chamber are known. The damping elements have a piston rod which is arranged on one side of the piston and is guided coaxially through the first cylinder chamber and is guided in a sealed manner out of the cylinder and which has first fastening device at its end projecting out of the cylinder for fastening to a first mass. A connection element formed as a hollow body is fastened by one end to the end of the cylinder opposite the end on the piston rod side, the extension of this connection element diverging from a coaxial extension relative to the cylinder, and the other end of the connection element has a second fastening device for fastening to a second mass. The interior of the connection element is connected to the second cylinder chamber, and the end of the connection element having the second fastening device is closed. A movable separating piston is arranged between the second cylinder chamber and the interior of the connection element, which separating piston separates the region of the second cylinder chamber that is filled with hydraulic medium from a region of the connection element that is filled with a compressible medium which is under pre-pressure.

Damping elements of the type mentioned above are used, e.g., in vehicles between a first mass, namely the passenger compartment which is to be kept free of vibrations, and a second mass, namely the wheels which undergo vibrations during driving operation, or the chassis. The damping element is connected, for example, to the first mass by the piston rod and to the second mass by a fastening device. The problem with the connection element is that it often cannot extend coaxial to the cylinder but rather must be guided around other structural component parts in the installed state. In known damping elements, the connection element is a cylindrical tube which extends at an angle to the longitudinal axis of the cylinder, the second fastening device being fastened to the lateral region of the connection element. The separating piston is displaceably arranged in the connection element. Therefore, the cylindrical tube can be filled with the compressible medium along only a part of its length. This small volume of compressible medium leads to a relatively steep and, therefore, uncomfortable spring characteristic of the gas spring formed by this volume.

Therefore, it is an object of the invention to provide a damping element of the type mentioned above which avoids the aforementioned disadvantages in a simple manner and allows a flatter spring characteristic of the volume of compressible medium when the connection element does not extend coaxially.

SUMMARY OF THE INVENTION

This object is met according to the invention in that the connection element has at its end region facing the cylinder a tube cross section which has an outer diameter corresponding to the inner diameter of the cylinder and is inserted into the cylinder and tightly and fixedly connected to the latter, wherein the separating piston is arranged so as to be coaxially displaceable in the cylinder and its displaceability is limited relative to the end region of the cylinder by the front side of the end region of the connection element.

As a result of this construction, the entire interior of the connection element as well as a portion of the interior of the cylinder are available for the compressible medium, e.g., a gas. This relatively large volume of compressible medium leads to a flatter spring characteristic and a reduced influence over large temperature ranges of this gas spring.

At the same time, the arrangement and tight connection of the connection element to the cylinder can be produced in a simple manner, wherein the front side of the end region of the connection element projecting into the cylinder simultaneously forms an end stop for the maximum stroke of the separating piston in its one movement direction.

The connection element can be shaped in accordance with installation conditions and need not extend, either in its entirety or in part, in a straight line.

If the front side of the end region of the connection element projecting into the cylinder is oriented at right angles to the longitudinal axis of the cylinder, tilting of the separating piston is prevented when the separating piston abuts at this front side.

If the front side of the end of the connection element facing the second fastening device is oriented at right angles to the longitudinal axis of the cylinder, a precisely positioned fastening of the second fastening device is possible in a simple manner.

In so doing, the second fastening device can simultaneously form a closure of the interior of the connection element.

The end region facing the cylinder and/or the end region facing the second fastening device preferably has a round cross section.

A coaxial load on the cylinder is achieved in this way, and a bending moment on the cylinder is prevented in that the first fastening device and second fastening device are arranged coaxial to the longitudinal axis of the cylinder.

In its region between the end region facing the cylinder and the second fastening device, the connection element can have a cross section which diverges entirely or partially from a cylindrical shape and which is therefore suited to the existing installation conditions.

A possibility for inexpensive production consists in that the connection element is an arcuately deformed tube.

A possibility for connecting the connection element to the cylinder in a simple and tight manner consists in that the connection element is welded to the cylinder in the end region of the connection element which faces the cylinder and which has a tubular cross section.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

An embodiment of the invention is described more fully in the following with reference to the drawings in which:

FIG. 2 is a top view of a connection element of the damping element according to FIG. 1;

FIG. 3 is a sectional view of the connection element according to FIG. 2 along line II-II;

FIG. 4 is an enlarged view of the end region of the connection element according to FIG. 3, which end region faces the cylinder; and FIG. 5 is a perspective view of the connection element according to FIG. 2.

DETAILED DESCRIPTION OF THE PRESENTLY PREFERRED EMBODIMENTS

Figure 1:
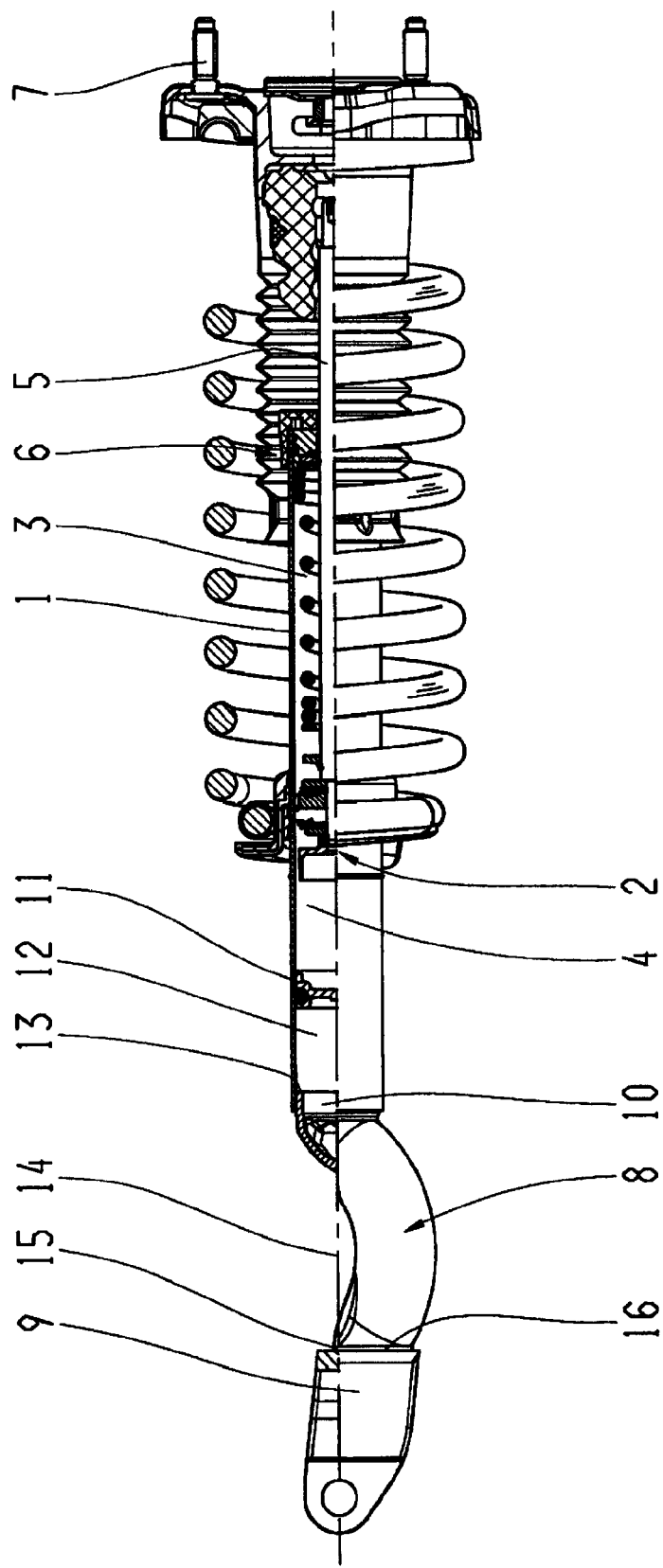
FIG. 1 is a side view of a damping element of the present invention in half-section.

The damping element shown is a mono-tube damper and has a cylinder 1 whose interior is divided by an axially displaceable piston 2 into a first cylinder chamber 3 and a second cylinder chamber 4, both of which are filled with hydraulic oil. Fastened to one side of the piston 2 is a piston rod 5 which is guided outward coaxially through the first cylinder chamber 3 and through a guiding and sealing unit 6 which closes the first cylinder chamber 3 axially outwardly.

The outer, free end of the piston rod is connected to first fastening device 7 which can be connected to a first mass, namely a vehicle body mass or a wheel mass of a vehicle.

Throttles, not shown, through which hydraulic oil can flow from the first cylinder chamber 3 to the second cylinder chamber 4, and vice versa, are arranged in the piston 2.

A connection element 8 is arranged at the end of the cylinder 1 opposite the first fastening device 7. The connection element 8 in turn has second fastening device 9 at its end opposite the cylinder 1.

The connection element 8 comprises an arcuately deformed tube which has at its end region 10 facing the cylinder 1 a round tube cross section extending coaxial to the cylinder 1. This end region 10 has an outer diameter which corresponds to the inner diameter of the cylinder 1 and is inserted into the cylinder 1 and fixedly and tightly connected to the cylinder 1 by a weld connection.

The portion of the cylinder 1 facing out of the connection element 8 from the piston 2 is divided by a displaceable separating piston 11 which separates the second cylinder chamber 4 from a gas space 12 filled with gas. The gas space 12 comprises the end region of the cylinder 1 facing the connection element 8 and the interior of the connection element 8 which is connected thereto and forms a compensation space for the displacement volume of the second cylinder chamber 4, which displacement volume is increased by the volume of the piston rod.

A stop which limits the maximum outward stroke of the separating piston 11 is formed by the front side 13 of the end region 10 of the connection element 8, which end region 10 projects into the cylinder 1, the front side 13 extending at right angles to the longitudinal axis 14 of the cylinder.

The end region 15 of the connection element 8 remote of the cylinder 1 likewise extends at right angles to the longitudinal axis 14 of the cylinder 1 and is closed by a welded-on, plate-like portion 16 of the second fastening device 9. These second fastening device 19 can be connected to a second mass, namely a wheel mass or chassis mass of a vehicle.

The application of force on the first fastening device 7 and second fastening device 9 takes place coaxial to the longitudinal axis 14 of the cylinder 1.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A damping element, particularly for a vehicle, for arrangement between two masses comprising:
   a cylinder having an interior and an inner diameter;
   a piston displaceably arranged within said cylinder and dividing said interior of said cylinder into a first cylinder chamber and a second cylinder chamber filled with hydraulic medium;
   a piston rod arranged on one side of said piston and guided coaxially through said first cylinder chamber and guided in a sealed manner out of said cylinder, said piston rod including a first fastening device for fastening to a first mass; said piston including a throttle connection between said first cylinder chamber and said second cylinder chamber;
   a connection element formed as a hollow body having an interior and a first and second end, said first end fastened to an end of said cylinder opposite the end on the piston rod side, said connection element extending in a direction that diverges from a coaxial extension relative to said cylinder, said second end of said connection element having a second fastening device for fastening to a second mass, said interior of said connection element being connected to said second cylinder chamber, said second end of said connection element having said second fastening device being closed;
   a movable separating piston arranged in said second cylinder chamber , said separating piston separating a region of said second cylinder chamber filled with hydraulic medium from a region of said connection element filled with a compressible medium under pre-pressure;
   said connection element having an end region facing said cylinder and said end region of said connection element having a front side, said connection element having at said end region a tube cross section having an outer diameter corresponding to said inner diameter of said cylinder, said connection element being inserted into said cylinder and tightly and fixedly connected to said cylinder;
   said separating piston is arranged so as to be able to be coaxially displaceable in said cylinder, the displaceability of said separating piston limited relative an end region of said cylinder by said front side of said end region of said connection element; and
   wherein said connection element is an arcuately deformed tube.

2. The damping element according to claim 1, wherein said front side of said end region of said connection element projecting into said cylinder is oriented at right angles to a longitudinal axis of said cylinder.

3. The damping element according to claim 1, wherein said front side of the second end of said connection element facing said second fastening device is oriented at right angles to a longitudinal axis of said cylinder.

4. The damping element according to claim 1, wherein said first fastening device and said second fastening device are oriented at right angles to a longitudinal axis of said cylinder.

5. The damping element according to claim 1, wherein in the region of said connection element between said end region facing said cylinder and said second fastening device, said connection element has a cross section which diverges at least partially from a cylindrical shape.

6. The damping element according to claim 1, wherein said end region of said connection element facing said cylinder has a tubular cross section, and wherein said connection element is welded to said cylinder in said end region.

\* \* \* \* \*